No. 639,979. Patented Dec. 26, 1899.
M. HICKEY.
APPARATUS FOR RECOVERING WASTE ALCOHOL FROM LIQUOR CASKS.
(Application filed Mar. 1, 1899.)
(No Model.)
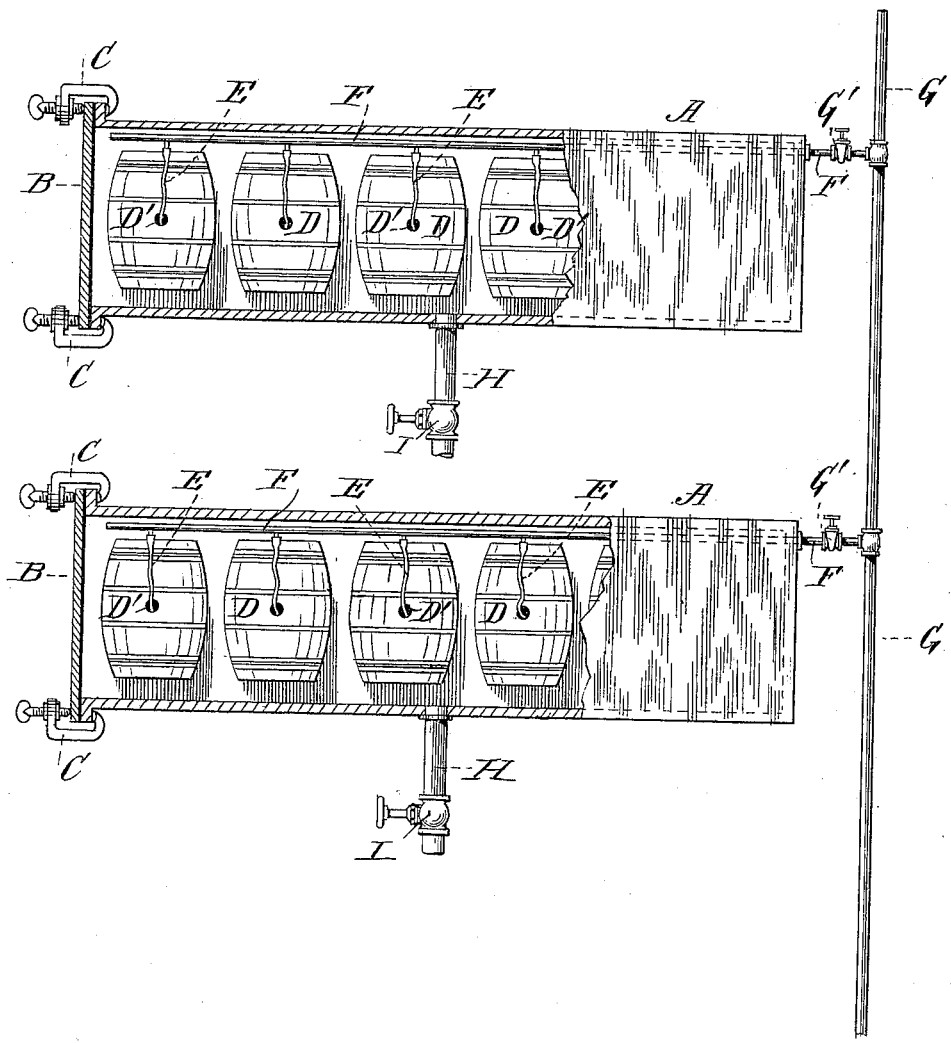

UNITED STATES PATENT OFFICE.

MICHAEL HICKEY, OF BOSTON, MASSACHUSETTS.

APPARATUS FOR RECOVERING WASTE ALCOHOL FROM LIQUOR-CASKS.

SPECIFICATION forming part of Letters Patent No. 639,979, dated December 26, 1899.

Application filed March 1, 1899. Serial No. 707,355. (No model.)

*To all whom it may concern:*

Be it known that I, MICHAEL HICKEY, of Boston, in the county of Suffolk and State of Massachusetts, have invented certain new and useful Improvements in Apparatus for Recovering Waste Alcohol from Liquor-Casks, of which the following is a specification.

My invention relates to the recovering of waste alcohol from casks and barrels, as a large percentage of the contained alcohol is absorbed by the wood of which the casks are made, and where the interior of the cask has been charred the amount of alcohol absorbed is greater, owing to the porous nature of the charred wood.

I am aware that casks and barrels have been cleansed by introducing steam therein and volatilizing the alcohol absorbed, the alcohol passing off in the form of vapor with the escaping steam, whereas in my invention the vaporized alcohol is led to a condenser and reclaimed.

My invention consists of certain novel features hereinafter described, and particularly pointed out in the claims.

In the accompanying drawing the figure represents a plan view of my apparatus with the top of the tanks broken away to show the interior.

Each tank A is provided with a door B, which is locked in position by the clamps C or by any other suitable fastening device. By opening the door B casks of all sizes are placed within each tank. The casks D have the usual bung-hole D', into which is inserted a rubber or other suitable tube E of smaller diameter than the bung-hole and each of which is connected with a branch steam-pipe F, receiving its steam from the main steam-pipe G, and the flow of the steam into the pipe F is controlled by a suitable valve G'.

H represents a pipe by which the vaporized alcohol is led to a condenser.

In operation when the door B is closed and the valve G' is opened the steam enters the interior of each cask through the connections above described and volatilizes more or less of the absorbed alcohol, which passes out through the bung-hole and is confined within the closed tank, and the only escape of said volatilized alcohol is through the pipe H to the condenser, where the volatilized alcohol is condensed and reclaimed. Owing to the open communication between the interior of each cask and the tank by reason of the bung-hole D' being larger than the tube E the pressure within the casks and within the tank is the same, so that there is no danger of the casks being injured in any way by the pressure. Any number of tanks may be used and connected to the main steam-pipe and any number can be cut out of use by closing the steam-valve. After the casks have been confined about two hours within the tank the valve G' is closed and the door B opened and the casks removed and a new set of casks introduced for treatment at any desired time.

In the pipe H is placed a globe-valve I for the purpose of regulating the pressure of the steam and volatilized alcohol passing to the condenser.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In an apparatus for recovering waste alcohol from empty liquor-casks, a closed tank for containing the empty casks, a steam-pipe leading into said tank, connections leading from said pipe and adapted to pass through the bung-holes of the casks and having diameters less than the diameters of the bung-holes to provide passages connecting the interiors of the casks with the interior of the tank, and a pipe leading from said tank to a condenser.

2. In an apparatus for recovering waste alcohol from empty liquor-casks, a closed tank for containing the empty casks, a steam-pipe leading into said tank, connections leading from said pipe and adapted to pass through the bung-holes of the casks and having diameters less than the diameters of the bungholes to provide passages connecting the interiors of the casks with the interior of the tank, a pipe leading from said tank to a condenser, and means for regulating the pressure of the steam in said tank.

In testimony whereof I have signed my name to this specification, in the presence of two subscribing witnesses, this 25th day of February, A. D. 1899.

MICHAEL HICKEY.

Witnesses:
A. L. MESSER,
C. A. STEWART.